Feb. 18, 1936.     F. SCHROTTKE     2,030,943
PRESSURE COMPENSATOR FOR OIL OR COMPOUND FILLED CABLES
Filed Oct. 29, 1931
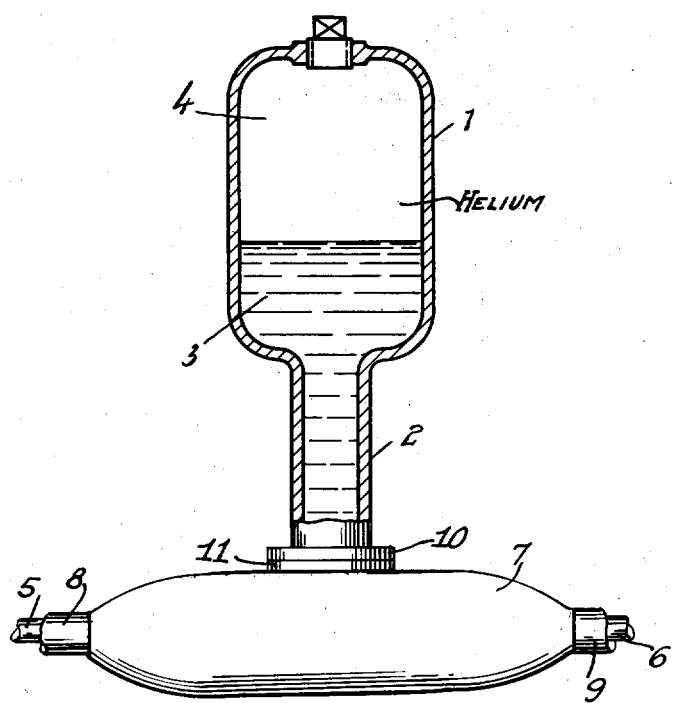
Inventor:-
Franz Schrottke
By  [signature]
    atty.

Patented Feb. 18, 1936

2,030,943

UNITED STATES PATENT OFFICE 2,030,943

PRESSURE COMPENSATOR FOR OIL- OR COMPOUND-FILLED CABLES

Franz Schrottke, Berlin-Charlottenburg, Germany, assignor to Siemens-Schuckertwerke Aktiengesellschaft, Berlin-Siemensstadt, Germany, a corporation of Germany Application October 29, 1931, Serial No. 571,943
In Germany November 1, 1930

2 Claims. (Cl. 173—264)

My invention relates to pressure compensators for oil- or compound-filled cables.

It has, hitherto, been customary to locate pressure compensators, especially in the neighborhood of cable joints, for oil- or compound-filled cables so as to cause the oil or the impregnating compound to expand with increasing temperature and to contract during the cooling. In order to effect, in the cooling period, a sufficient supply of oil or impregnating compound to the cable so as to ensure a complete impregnation of the cable, the upper portion of the compensator has been, as a rule, filled with gas under pressure, especially with nitrogen or compressed air. The use of air or nitrogen has, however, the disadvantage that the oil or compound absorbs a considerable amount of nitrogen or air, which amount of gas enters into the interior of the cable where it undergoes a certain segregation, i. e. it remains incompletely dissolved in the oil or compound. As a result thereof, gas or air bubbles will then develop which lead to serious consequences such, for instance, as to ionization, to an unpermissible rise in temperature of the cable and eventually to flash overs in the same.

The object of my present invention is to obviate the aforesaid drawbacks, at least to a great extent, by filling the upper portion of the pressure compensator with helium instead of with air or nitrogen, thus greatly enhancing the reliability of the cable network.

The accompanying drawing shows an embodiment of the invention in a conventional, somewhat diagrammatic manner. Certain parts are shown broken away and in section in order to describe details more readily. The proportions of the embodiment shown in the drawing are somewhat distorted for the sake of comprehensive description.

Numeral 1 designates the container or receptacle of a pressure compensator which is connected by means of the tube 2 with the interior of a cable 5—6 by way of the casing 7. Numerals 8—9 indicate the cable sheaths. The container 1 may be mounted on the casing 7 in any suitable manner, for example, by connecting the flange 10 on the lower end of the tube 2 with the flanged portion 11 of the casing 7. The container 1 is partially filled with an insulating medium such as oil as shown at 3 which is in direct contact with the gas 4. In accordance with the invention, helium is employed for this purpose as indicated in the drawing.

It has been ascertained that by the use of helium the oil or impregnating compound absorbs far less of this gas than it would absorb air or the hitherto employed inert gases such, for instance, as nitrogen. Tests have proved that the quantity of helium absorbed by oil or impregnating compound amounts only to approximately one-fourth of the absorbed air or nitrogen. It will be clear, therefore, that only a very small amount of dissolved helium can enter the interior of the cable since the oil absorbs only a very much smaller amount of helium than it would absorb other gases, such as nitrogen. Consequently, when the impregnating compound or oil increases in temperature, only a very much smaller amount of gas will be separated, whereby the development of gas bubbles is reduced to a minimum. In fact only very few and very small gas bubbles will develop. The reliability of the complete cable network will, therefore, be greatly enhanced as compared with the reliability of a cable system where pressure compensators are filled with air or nitrogen.

What I claim is:

1. In combination with a cable containing a fluid insulating medium which tends to absorb gases but in which helium is relatively insoluble, a pressure compensator comprising a reservoir connected to said cable, said reservoir containing said fluid insulating medium and helium in direct contact therewith.

2. In combination with an oil filled cable, a device for compensating for pressure fluctuations within said cable and for inhibiting the formation of gas pockets within the oil in said cable, said device comprising, a reservoir containing insulating oil in direct contact with the oil in said cable, and helium gas in said reservoir and in direct contact with said oil therein, said gas being relatively insoluble in said oil, whereby the ingress of gas into said oil is inhibited to inhibit the formation of gas pockets therein during the normal operation of said cable.

FRANZ SCHROTTKE.